(12) United States Patent
Volta et al.

(10) Patent No.: US 8,117,724 B2
(45) Date of Patent: Feb. 21, 2012

(54) METHOD FOR JOINING TOGETHER STEEL PIPES FOR CONVEYING FLUIDS UNDER PRESSURE

(75) Inventors: Franco Volta, Emilia (IT); Diego Gallerani, Bologna (IT)

(73) Assignee: Hera S.p.A., Bologna (IT)

( * ) Notice: Subject to any disclaimer, the term of this patent is extended or adjusted under 35 U.S.C. 154(b) by 1032 days.

(21) Appl. No.: 12/036,595

(22) Filed: Feb. 25, 2008

(65) Prior Publication Data

US 2009/0211072 A1      Aug. 27, 2009

(51) Int. Cl.
*B23P 6/00* (2006.01)
*B23P 19/04* (2006.01)

(52) U.S. Cl. ............... 29/402.09; 29/402.13; 29/402.11; 138/89; 138/90; 138/97; 285/12; 285/31; 285/93; 285/332; 285/369

(58) Field of Classification Search ............... 29/402.13, 29/402.09, 402.11, 402.16; 138/89, 90, 97; 285/12, 31, 93, 21.2, 332, 369, 383, 423, 285/915, 342, 296
See application file for complete search history.

(56) References Cited

U.S. PATENT DOCUMENTS

| | | | |
|---|---|---|---|
| 3,600,010 A | | 8/1971 | Downs, III et al. |
| 4,690,434 A | * | 9/1987 | Schmidt .......................... 285/31 |
| 5,029,905 A | * | 7/1991 | Johnson .......................... 285/31 |
| 5,393,103 A | * | 2/1995 | Cretzler .......................... 285/31 |
| 6,241,424 B1 | | 6/2001 | Bath et al. |
| 6,450,544 B2 | * | 9/2002 | Becker et al. ................ 285/21.2 |
| 7,264,020 B2 | * | 9/2007 | Wolk .............................. 138/90 |

FOREIGN PATENT DOCUMENTS

| | | |
|---|---|---|
| CA | 1 250 027 | 2/1989 |
| DE | 34 23 952 | 1/1986 |
| DE | 195 42 114 | 12/1996 |
| DE | 197 22 275 | 12/1998 |
| DE | 20 2004 001 554 | 4/2004 |

* cited by examiner

*Primary Examiner* — Richard Chang
(74) *Attorney, Agent, or Firm* — Stites & Harbison PLLC; Marvin Petry

(57) ABSTRACT

A method for joining fluid carrying steel pipes together including the following steps. Identifying a subject pipe section to be replaced and intercepting the fluid flow by fastening stoppers inside of pipe portions upstream and downstream from the subject pipe section. Removing the subject pipe section, leaving in place upstream and downstream pipe portions. Inserting along each of the first and second pipe portions a protective stopper and chamfering the edges of those pipe portions and then mounting first and second sliding sleeves with sealing rings thereover. Removing the protective stoppers from the pipe portions and positioning between those pipe portions a new connection piece. Displacing the first and second sliding sleeves onto the connection piece so that sealing rings are arranged on the connection piece and fixing the sliding sleeves to the pipe portions and to the connection piece.

10 Claims, 3 Drawing Sheets

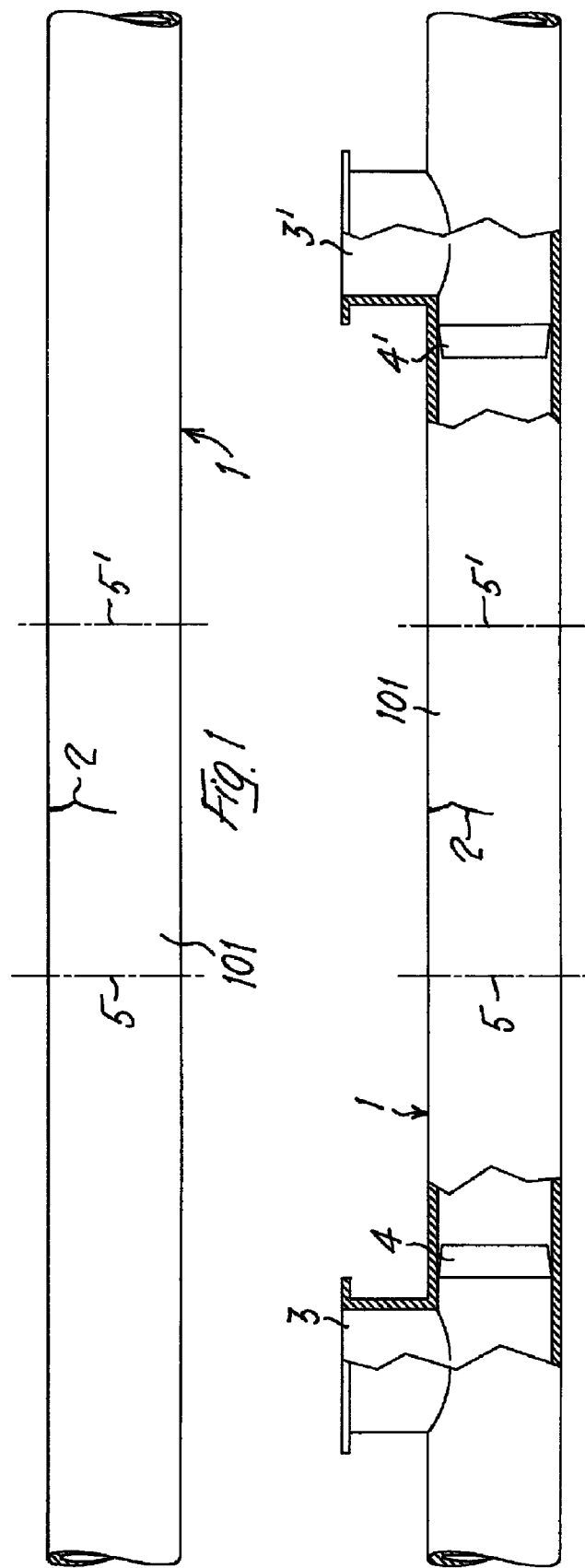

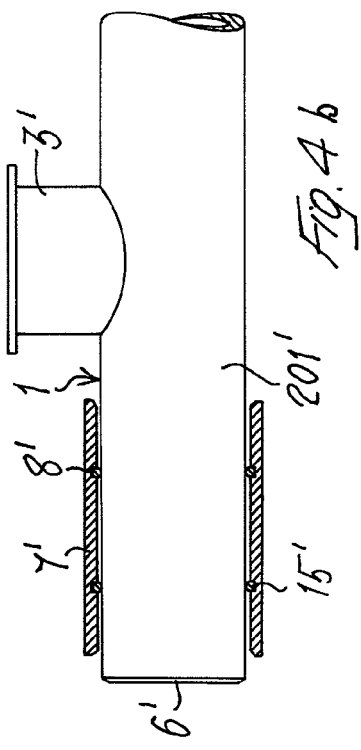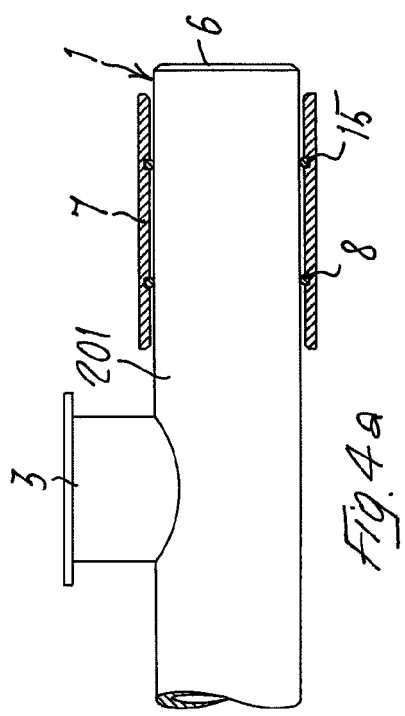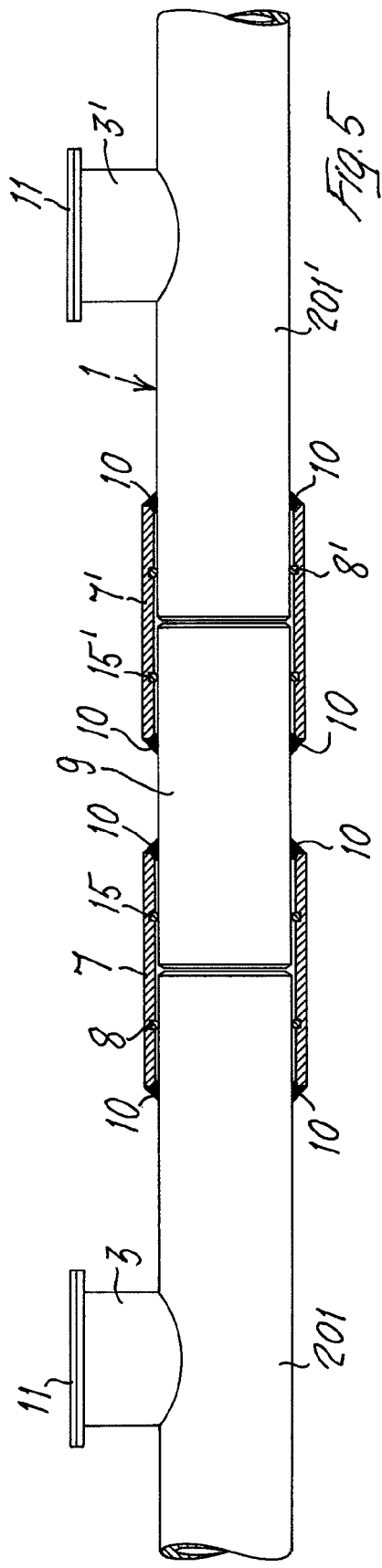

United States Patent US 8,117,724 B2

METHOD FOR JOINING TOGETHER STEEL PIPES FOR CONVEYING FLUIDS UNDER PRESSURE

BACKGROUND AND SUMMARY OF THE INVENTION

The present invention relates to a method for joining together operative steel pipes for conveying fluids such as gas, water or the like.

As is known, in pipes for conveying fluids such as gas or water, it may happen that a section of the pipe must undergo maintenance or even be replaced in order to avoid the loss of fluid conveyed by the pipe or simply be removed in order to allow insertion in this pipe of a given connection piece, such as a branch-off piece, a pipe section, a valve or the like. These operations for the maintenance and repair of damaged pipes or for replacing a pipe section with a different tubular connection piece require the use of complex and costly means and/or operations since this gas or water conveying pipe is normally situated underground and the section to be replaced must, among other things, be isolated with interception of the fluid upstream and downstream thereof.

The object of the present invention is therefore to provide a method for joining together pipes for conveying fluids such as gas, water or the like, by means of which it is possible to repair in a simple, efficient and low-cost, but in particular reliable manner a damaged pipe section and restore normal operation thereof effectively or replace a pipe section with another connection piece such as a branch-off piece, a valve or the like.

This object is achieved with the present invention by means of a method for joining together pipes for conveying fluids, characterized by the following steps:

a) identifying a pipe section to be replaced and intercepting, using suitable stopper means, the fluid flow inside the pipe upstream and downstream of this pipe section;

b) removing the pipe section to be replaced so as to obtain upstream and downstream thereof two pipe sections;

c) inserting stopper means for protection against any seepage of fluids (gas or liquids) and therefore possible initial leakage or dripping of water, oil, etc., and removing by means of milling from the end of the pipe section any burrs or sharp edges which may damage the seal and then mounting on each pipe section a sliding steel sleeve provided with sealing means;

d) removing said protective stopper means from the pipe sections and positioning between them a new connection piece, such as a pipe section, a branch-off piece, a valve or the like;

e) displacing said sliding sleeves on these pipe sections so that the seal also embraces this new connection piece;

f) welding these sliding sleeves to these pipe sections and to this connection piece.

BRIEF DESCRIPTION OF THE DRAWINGS

Further characteristic features and advantages of the present invention will be understood more clearly from the following description considered by way of a non-limiting example with reference to the accompanying drawings in which:

FIG. 1 shows a side elevation view of a fluid-conveying pipe with a damaged section;

FIG. 2 shows an elevation view of the pipe according to FIG. 1 provided, on the sides of the damaged section, with two fastening systems for the plugging machine and main stopper plugs;

FIG. 3a shows a side elevation view of a first pipe section according to FIG. 1, in particular the section arranged on the left of the damaged and removed pipe section with the safety stopper inserted, which in the case shown is, for example, a mechanical expansion plug;

FIG. 3b shows a side elevation view of a second section of the pipe according to FIG. 1, in particular the section arranged on the right of the damaged and removed pipe section with the safety stopper inserted, which in the case shown is, for example, a ball stopper;

FIG. 4a shows the pipe section according to FIG. 3a where a first sliding sleeve has been mounted and the safety stopper removed, while the main stopper remains operative;

FIG. 4b shows the pipe section according to FIG. 3b where a second sliding sleeve has been mounted and the safety stopper removed, while the main stopper remains operative;

FIG. 5 shows the two pipe sections according to FIG. 4a and FIG. 4b between which a new pipe section has been inserted.

DESCRIPTION OF THE PREFERRED EMBODIMENT OF THE INVENTION

Figure 6:
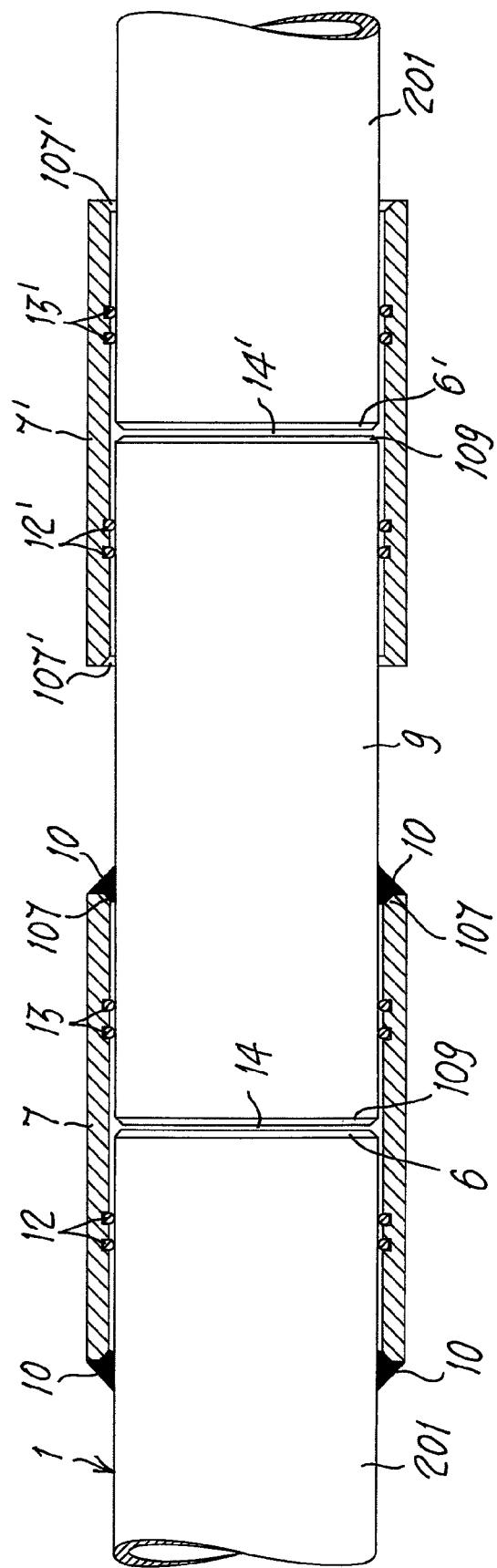
FIG. 6 shows a side elevation view on a larger scale of the new pipe section partially inserted inside these first and second sliding sleeves.

With reference to these accompanying drawings and in particular to FIG. 1 thereof, 1 denotes an operative steel pipe 1 for conveying fluids such as gas, water or the like. This pipe 1 contains a damaged section 101 in which, for example, a crack or breach 2 has formed.

This section 101 could also not be damaged and the operation on the pipe 1, which is to be performed according to the present method, could be envisaged in order to replace this section 101 with a branch-off piece, a union or other tubular part for conveying fluids.

FIG. 2 shows the pipe 1 in which two tubular fastening elements 3 and 3' for the stopper plug insertion system have been welded upstream and downstream of the breach 2 along the section 101, said elements being positioned transversely with respect to said pipe 1. The fastening system shown here is of the flanged type and has the same diameter as the pipe. However there exist different types of fluid plugging systems with different systems for performing fastening onto the pipes, and so the system shown has been provided purely by way of example and has the function of illustrating application of the sleeve. Two stopper plugs 4 and 4' are inserted inside this pipe 1, by means of these tubular elements 3 and 3' and are also positioned upstream and downstream of said breach 2 so as to interrupt the fluid flow inside the pipe 1 and isolate the section 101 which is damaged or which in any case must be replaced.

FIG. 3a shows a first section 201 of the pipe 1, in particular the section situated on the left when viewing FIGS. 1 and 2, with the plug 4 inside it. The safety stopper 4" has been inserted at the end of the pipe section 201 and in the case shown is, for example, a mechanical expansion plug.

FIG. 3b shows similarly a second section 201' of the pipe 1, in particular the section situated on the right when viewing FIGS. 1 and 2. The safety stopper 4''' has been inserted at the end of the pipe section 201' and in the case shown is, for example, a ball stopper.

These pipe sections 201 and 201' are obtained by removing the damaged pipe section 101, for example along the dot-dash lines 5 and 5' shown in FIGS. 1 and 2. These sections 201 and 201' are normally aligned with their two free ends directed towards each other, even though in some cases the stresses from the ground which are transmitted to the pipe at the time of cutting of the pipe may cause a slight misalignment of the free ends. At this point, after fitting further safety plugs 4" and 4'" to the ends of the sections, an annular chamfer 6 and 6' is formed externally on each part, i.e. on the end of the section 201 and the end of the section 201', respectively.

FIG. 4a shows the step where, after the safety plugs have been removed, a first sliding sleeve 7 provided with at least two sealing rings 8 and 15 has been mounted on the pipe section 201 via the end with the annular chamfer 6. Similarly (see FIG. 4b) a second sliding sleeve 7' provided with the two associated sealing rings 8' and 15' is mounted on the pipe section 201'.

FIG. 5 shows the pipe 1 at the end of the maintenance operation according to the present method, which will be described in detail below. A new pipe section 9 is positioned between the free ends with annular chamfers 6 and 6' of the two pipe sections 201 and 201', said section also having its ends previously chamfered so as not to damage the seals during the sliding movement. The length of the new pipe section may be smaller than that of the pipe section removed since the difference in length is taken up by the distance between the sealing points of the seals 8 and 15 and 8' and 15' on the sleeve itself. Moreover the diameter of the new section may also be subject to a certain tolerance with respect to the existing pipe since the double seat of the seal with varying depths indicated in FIG. 6, by the point 12 and 13 and 12' and 13', allows prior locating of the most suitable position for the O-ring; it is envisaged moreover being able to produce sleeves which are dimensionally modified in order to connect together significantly different diameters while respecting obviously the present procedure with the sole constraint of positioning the sleeves on the smaller-diameter pipe section and then displacing it onto the larger-diameter section. The thickness of the pipe wall and therefore the internal diameter are of no significance. The ends of this new pipe section 9 face the annular chamfers 6 and 6' of the two pipe sections 201 and 201' and the sliding sleeves 7 and 7' are displaced, with respect to that shown in FIGS. 4a and 4b, towards said new pipe section 9, so that the outermost sealing rings 8 and 8' of the two sliding sleeves 7 and 7' embrace the outer surface of the associated pipe sections 201 and 201', while the innermost sealing rings 15 and 15' of said sleeves embrace the outer surface of said new pipe section 9. These sleeves 7 and 7' are fixed to the associated pipe section 201 and 201' and to the new pipe section 9 by means of welds 10, which are provided at the ends thereof. As can be seen, moreover, the tubular elements 3 and 3' are closed by means of associated lids 11 and 11', obviously after removal of the plugs 4 and 4' shown in FIGS. 2, 3a and 3b.

As mentioned above, in place of this new pipe section 9 it would be possible to insert between said pipe sections 201 and 201' also a branch-off piece, a valve or other tubular part for conveying fluids, depending on the specific requirements.

FIG. 6 shows, on a larger scale, the new pipe section 9 partially inserted inside the two sliding sleeves 7 and 7'. Each of these sleeves 7 and 7' (see for example the sleeve 7) comprises internally two pairs 12 and 13 of sealing rings: the first pair 12 of sealing rings is positioned around the pipe section 201, while the second pair is positioned around the pipe section 9. Similarly the pair 12' of sealing rings of the sleeve 7' is positioned around the pipe section 201', while the pair 13' of sealing rings is positioned around the pipe section 9. Annular chamfers 107 and 107' are formed internally at both the ends of each of these sleeves 7 and 7' in order to facilitate sliding thereof on the new pipe section 9 and on the two sections 201 and 201'. This new pipe section 9 also has externally at each end annular chamfers 109 and 109' which face, respectively, the annular chamfer 6 of the pipe section 201 and the annular chamfer 6' of the pipe section 201'. The purpose of these chamfers 109 and 109' is to safeguard the pairs 13 and 13' of sealing rings of the two sleeves 7 and 7' during sliding thereof on the new pipe section 9. In the figure, finally, it is possible to see the welds 10 by means of which the ends of the sleeve 7' are fixed to the pipe section 201', and similar welds, which are not shown in FIG. 6 for the sake of clarity of illustration, are envisaged for the sliding sleeve 7 of the section 201. It is possible to envisage a certain spacing gap 14 and 14' between the ends of the annular chamfers 6 and 6' of the two sections 201 and 201' and the ends of the new pipe section 9.

The various steps of the present method for joining together fluid conveying pipes are now described. Considering the pipe 1 in FIG. 1 which has the damaged section 101 owing to the presence, for example, of a breach 2, firstly the outer sheathing normally provided on a fluid conveying pipe is removed and then the outer diameter of the pipe 1 is measured at four diametrically opposite points in order to check for any ovalization of the pipe. In the case where there is a significant degree of ovalization, for example greater than 2 mm, it is necessary to reduce it to a lower value. The appropriate sliding sleeve 7 and 7' is identified and the two sealing rings 8, 15, 8', 15' or pairs 12, 12' and 13, 13' of sealing rings are inserted inside it. The tubular connecting elements 3 and 3' are then fixed (see FIG. 2) upstream and downstream of the damaged section 101 of the pipe 1. By means of these tubular connecting elements 3 and 3', it is possible to insert in the pipe 1 two stopper plugs 4 and 4' and then perform cutting of the pipe along the lines 5 and 5', thereby obtaining (see FIGS. 3a and 3b) two pipe sections 201 and 201', the free ends of which are machined externally so as to obtain annular chamfers 6 and 6', in order to allow easier mounting of the sliding sleeves 7 and 7' and the sealing rings with which they are provided. These sleeves 7 and 7' (see FIGS. 4a and 4b) are initially mounted completely onto the associated pipe sections 201 and 201'. The stopper plugs 4 and 4' are then extracted and then (see FIG. 5) the new pipe section 9 is positioned between the ends with annular chamfers 6 and 6' of the two sections 201 and 201', so that it is aligned horizontally and vertically with them. The ends of this new pipe section 9 are already provided with annular chamfers 109 and 109' and are already lubricated.

At this point the sleeves 7 and 7', which are positioned as shown in FIGS. 4a and 4b, are slid towards said new pipe section 9 until the latter is at least partially inserted inside them, as shown in FIGS. 5 and 6. As mentioned in connection with FIG. 6, it is possible to envisage a certain spacing gap 14 and 14' between the free ends of the pipe sections and the ends of the new pipe section. At this point, the alignment of the new section 9 with the two pipe sections 201 and 201' is checked as accurately as possible and the various parts are fixed together by means of the angle welds 10 at the ends of the sleeves 7 and 7', as shown in FIGS. 5 and 6.

We claim:

1. A method for joining together steel pipes for conveying fluids under pressure, comprising the following steps:

a) identifying in a pipe a pipe section to be replaced and intercepting, by fastening stopper systems at suitable points, the fluid flow inside the pipe upstream and downstream of the pipe section;
b) after the fluid flow has been intercepted, removing the pipe section to be replaced so as to obtain upstream and downstream thereof a first and a second pipe section;
c) inserting along each of the first and second pipe sections a protective stopper, chamfering the edges of the first and second pipe sections and then mounting a first and second sliding sleeve provided with sealing means;
d) removing the protective stoppers from the first and second pipe sections and positioning between them a new connection piece, such as a pipe section, a branch-off piece, or a valve;
e) displacing the first and second sliding sleeves on these first and second pipe sections so that the sealing means are arranged on the new connection piece; and
f) fixing the first and second sliding sleeves to the first and second pipe sections and to the connection piece.

2. The method according to claim 1, wherein the annular chamfers are formed internally at both ends of each of said first and second sliding sleeves.

3. The method according to claim 1, wherein, prior to said step a), any excessive ovalization of said pipe is checked and if necessary corrected.

4. The method according to claim 1, wherein the annular chamfers are formed externally on the free ends of said first and second pipe sections.

5. The method according to claim 1, wherein the ends of the new connection piece are lubricated and annular chamfers are formed on the outside thereof.

6. The method according to claim 1, wherein, during the positioning step d), the new connection piece is aligned horizontally and vertically with the first and second pipe sections.

7. The method according to claim 1, wherein the said first and second sliding sleeves positioned on the said first and second pipe sections and on the connection piece are fixed to the outer surfaces thereof by means of welds.

8. The method according to claim 1, wherein the sealing means are sealing rings which are each positioned in a double seat on the interior of the sliding sleeves wherein the seats can be of variable depth.

9. The method according to claim 1, wherein tubular connecting elements are fixed to the first and second pipe sections upstream and downstream of the pipe section to be replaced, so as to allow insertion inside of the pipe of at least one stopper plug situated upstream and downstream from the pipe section to be replaced, so as to intercept the flow of fluid in the pipe.

10. The method according to claim 1, wherein the sliding sleeves are mounted completely on the associated first and second pipe sections.

\* \* \* \* \*